United States Patent Office 3,515,648
Patented June 2, 1970

---

3,515,648
ANIONIC RESIN FOR ELECTROCONDUCTIVE PAPER
Thomas T. Chiu, Midland, Dale M. Pickelman, Auburn, and Eugene R. Moore, Midland, Mich., assignors to The Dow Chemical Company, Midland, Mich., a corporation of Delaware
No Drawing. Filed June 14, 1967, Ser. No. 645,895
Int. Cl. B41m 5/20
U.S. Cl. 204—2    13 Claims

ABSTRACT OF THE DISCLOSURE

Water-soluble salts of a copolymer of an $\alpha,\beta$-unsaturated dicarboxylic anhydride and a vinylidene monomer are effective electroconductive additives for paper used in electrographic printing.

BACKGROUND

A common requirement of a variety of electrographic printing processes is the need for an electroconductive paper. Although the substrate conductivity is a key factor, the conductivity of conventional paper is poor particularly at low humidity. Consequently, effective electroconductive additives compatible with other paper coating additives are required.

Silvernail and Zembal describe in U.S. Pat. 3,011,918 a cationic coating of a water dispersible vinylbenzyl quaternary ammonium polymer which has been widely used as an electroconductive additive. Yet, the compatibility of this cationic polymer with many typical paper coating ingredients is limited. Anionic polymers have generally been considered inferior as electroconductive additives for paper.

Anionic polymers have long been used in paper coating formulations. For example, Niles in U.S. Pat. 2,577,624 employs a water-soluble salt of a styrene/maleic anhydride copolymer as a pigment binder. However, anionic polymers have been generally regarded as inferior electro-conductive additives for paper.

STATEMENT OF THE INVENTION

It has now been discovered that certain water-soluble anionic copolymers can be incorporated in paper to achieve an electroconductivity equivalent to that obtained with quaternary ammonium resins. More specifically, this invention is an improved process for preparing paper suitable for electrographic printing by treating the preformed paper stock with an aqueous solution of a water-soluble salt of a copolymer of an $\alpha,\beta$-unsaturated dicarboxylic anhydride and a vinylidene monomer to incorporate from about 1–10 weight percent based on dry paper weight of said copolymer salt as an electroconductive additive. Preferably, the additive is a dibasic alkali metal salt of a vinylaromatic/maleic anhydride copolymer having a molecular weight of at least about 5,000 as indicated by a 10 weight percent solution viscosity in methyl ethyl ketone (MEK) of at least 0.7 cps. at 25° C. Particularly effective is the dipotassium salt of a styrene/maleic anhydride copolymer having a molecular weight of about 10,000–200,000 as shown by a standard 10% MEK viscosity of about 1.3–100 cps. at 25° C.

Not only are these anionic polymer effective electroconductive additives for non-impact printing paper, but also they are compatible with many pigments, binders and other additives used in coating formulations. They are free of objectional odors often encountered when quaternary ammonium polymers are used at high pH. The treated paper is not affected in color, strength or permanence. Furthermore, these polymers, particularly the higher molecular weight salts, contribute further by increasing the solvent holdout in the subsequent application of the photoconductive coating.

ELECTROCONDUCTIVE ANIONIC RESINS

Copolymers of $\alpha,\beta$-unsaturated dicarboxylic anhydrides and vinylidene monomers copolymerizable therewith have long been known. The production of styrene/maleic anhydride copolymers and hydrolysis to the corresponding salts for use as warp sizing is described in Voss et al. U.S. Pat. 2,047,398, Gerhart U.S. Pat. 2,230,240, and Vane U.S. Pat. 2,430,313. Recent process improvements are described by Muskat U.S. Pat. 3,085,994 and by Gray and Sparks U.S. Pat. 3,297,657. Also effective are salts of ethylene/maleic anhydride copolymers such as described by Zopf et al., U.S. Pat. 2,977,334.

Suitable copolymers can be made with other $\alpha,\beta$-unsaturated dicarboxylic anhydrides including chloromaleic, citraconic, itaconic and aconitic anhydrides.

Also suitable as comonomers are such vinylidene monomers as vinyltoluene, t-butylstyrene, mono- and dichlorostyrene, and $\alpha$-methylstyrene; $C_2$–$C_6$ alkenes such as propylene, isobutylene and butene-1; acrylonitrile and methacrylonitrile; vinyl alkyl ethers; and $C_1$–$C_4$ alkyl acrylates and methacrylates.

Usually, the copolymers most readily available are copolymers of maleic anhydride with a vinylaromatic monomer such as styrene or with an alkene such as ethylene, propylene or isobutylene. Preferred are copolymers of styrene/maleic anhydride.

The above polymers can be prepared by conventional polymerization methods. Normally, the copolymers contain about 25–65 mole percent of the polymerized $\alpha,\beta$-dicarboxylic anhydride and 75–35 mole percent of the comonomer. They are converted into the requisite salt form by conventional hydrolysis with aqueous ammonium or metal hydroxide. For optimum electroconductivity, a dibasic alkali metal salt of a hydrolyzed vinylidene/maleic anhydride copolymer is required. Particularly effective are the water-soluble alkali metal salts of a hydrolyzed styrene/maleic anhydride copolymer characterized by recurring units of the formula:

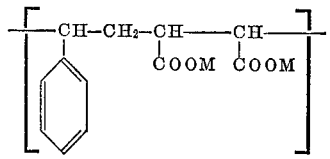

where M is an alkali metal such as sodium or ptoassium. Mixed salts can also be used and minor amounts of a polyvalent cation such as calcium, magnesium, zinc or aluminum may be desirable at times to increase the solution viscosity or solvent holdout characteristics.

Although a significant reduction in the surface resistivity is obtained by coating the base paper with all dibasic alkali metal salts of these anionic polymers, the dipotassium salt has a surprising and unexpected superiority reducing the surface resistivity by a factor 5–100 or more times that of the other alkali metal salts. The reason for this marked superiority is not known. An effect of this magnitude has not been observed with the potassium salts of other anionic polymers examined including the polysulfonates and polyacrylates.

A relatively wide molecular weight range of these anionic resins can be used. The more soluble lower molecular weight resins can be applied as a more concentrated aqueous solution, however, they also tend to penetrate further into the paper. Very high molecular weight resins are more difficult to apply as coatings without excessive dilution. In general, polymers of low and intermediate molecular weight or mixtures with an intermediate molecular weight are preferred. In terms of a linear polymer an average molecular weight of about 5,000–200,000 is preferred. Such polymers are characterized in anhydride form by a standard Ostwald viscosity as a 10 weight percent solution in methyl ethyl ketone of about 0.7–100 cps. at 25° C. After hydrolysis and in 25 percent aqueous solution at pH 8.5–10 such copolymers have a viscosity of up to 10,000 cps. or more.

PAPER COATING

In preparing an electrographic paper, a base stock paper is usually treated first with an electro-conductive additive and then coated with a photoconductive layer normally containing finely divided zinc oxide in a suitable insulating binder. The anionic electro-conductive resin is applied to the preformed paper stock by spraying, dipping, brushing, calendaring or similar conventional technique for impregnating or coating paper stock with the aqueous resin solution or dispersion. Depending on the specific electroconductive properties desired, it can be incorporated as a surface coating on one or both sides of the sheet, or by impregnating through the sheet.

Advantageously, it is applied by treating the paper sheet with an aqueous solution or dispersion containing about 5–40 weight percent anionic resin and a pH of about 8.5–10.0 to obtain a substantially uniform coating with a pickup of about 1–10 weight percent anionic resin. With a standard electrographic base paper, this corresponds to a surface coating of about 0.75–7.5 g./m.$^2$.

Because of the compatibility of the anionic resin with many conventional paper coating additives including binders and thickeners, the additive solution can be readily formulated for particular properties. For example, a cellulose ether or other non-ionic or anionic thickener may be desirable to minimize the penetration of a low molecular weight additive.

The following examples illustrate further the present invention. Unless otherwise stated, all parts and percentages are by weight.

EXAMPLE 1

Potassium S/MA copolymer (A) A mixture of 100 parts (0.96 mole) styrene and 100 parts (1.02 mole) maleic anhydride in 800 parts of methyl ethyl ketone was polymerized by heating for 20–24 hours at 80° C. after adding 0.1 weight percent benzoyl peroxide. The solvent was then stripped and the polymer heated at 180° C. at 2–4 mm. for 1 hour to remove unreacted monomer. The resulting solid copolymer containing 48.5% copolymerized maleic anhydride was then ground to a powder. Its Ostwald viscosity as a 10 weight percent solution in methyl ethyl ketone was 51.4 cps. at 25° C. corresponding to an average molecular weight of about 150,000.

(B) A portion of the styrene/maleic anhydride (S/MA) copolymer was hydrolyzed with 2 moles of aqueous potassium hydroxide per mole of anhydride to yield a clear aqueous resin solution containing 20.6% solids and having a pH of about 9.2.

The resin solution was used with a Meyer rod to coat the sized side of a commercial bleached sulfite base stock paper having a weight of 51 lb./3,300 ft.$^2$ (about 75 g./m.$^2$) to a resin pickup of 4.4%. Samples of the coated paper were equilibrated at room temperature in a chamber with a circulating, constant humidity atmosphere. When the surface and volume electrical resistivity were measured according to the general procedure of ASTM D–257–61. For comparison, uncoated control standards and the same base paper coated with a commercial cationic polymer were run concurrently.

Typical results at several resin pickup levels are given in Table 1. Note that the dipotassium S/MA resin is somewhat more effective than the cationic polymer in reducing the surface resistivity, a critical factor in electrographic printing.

TABLE 1.—SURFACE AND VOLUME RESISTANCE, 70° F.

| Additive | Pickup, Percent | Surface Resistance (ohm/square) | | Volume Resistance (ohm-cm.) | |
|---|---|---|---|---|---|
| | | 7% RH | 50% RH | 7% RH | 50% RH |
| Control | None | >3.0×10$^{13}$ | 2.7×10$^{11}$ | >3.0×10$^{13}$ | 6.8×10$^{10}$ |
| (K$^+$)$_2$ S/MA ((51.4 cps.) | 1.8 | 6.1×10$^{10}$ | 2.9×10$^8$ | 1.2×10$^{13}$ | 9.7×10$^9$ |
| | 4.4 | 1.3×10$^{10}$ | 8.9×10$^7$ | 5.3×10$^{12}$ | 1.1×10$^{10}$ |
| | 6.8 | 7.5×10$^9$ | 3.2×10$^7$ | 1.6×10$^{13}$ | 1.3×10$^{10}$ |
| Cationic Polymer [a] | 1.8 | 2.0×10$^{11}$ | 1.6×10$^9$ | 4.0×10$^{12}$ | 2.0×10$^9$ |
| | 4.4 | 3.0×10$^{10}$ | 5.0×10$^8$ | 2.0×10$^{12}$ | 2.0×10$^9$ |
| | 6.8 | 2.0×10$^9$ | 2.5×10$^8$ | 1.5×10$^{12}$ | 1.5×10$^9$ |

[a] Commercial vinylbenzyl quaternary ammonium polymer Q X 2611.7 from The Dow Chemical Company.

(C) In another test a commercial electro-conductive base paper from Mead Paper Co. was coated on the sized side with the 20% aqueous solution of 51.4 cps. (K$^+$)$_2$ S/MA using a No. 4 Meyer rod. Then a photoconductive solvent coating (7/1 ratio of AZO 661/Pliolite S–5B in toluene) was applied to the opposite side at a coating weight of 20 lbs./3000 ft.$^2$ (32 g./m.$^2$). Prints were made at 15% and 62% RH at 70° F., and examined for quality. Satisfactory prints were obtained at both low and high humidity with good intensity and no mottling or backprinting. Similar results have been obtained with other base stock papers.

EXAMPLE 2

S/MA molecular weight (A) A series of styrene/maleic anhydride copolymers of varying molecular weight as shown by the 10% MEK viscosity were hydrolyzed with aqueous potassium hydoxide and the resulting solutions ranging in pH from about 8.8–9.6 were used as an electroconductive coating. A No. 6 Meyer rod was used with 7.5, 10.0 and 12.5% aqueous solutions of the (K$^+$)$_2$ S/MA to coat a S. D. Warren 53 lb./ream (78 g./m$^2$) universal body stock with a pickup of about 2, 4 and 6% resin solids. Data such as shown in Table 2 indicate that the intermediate molecular weight resins are generally more effective electroconductive additives. The same surface resistivity ranking was obtained with several other base stocks.

TABLE 2.—(K+)₂ S/MA SURFACE RESISTIVITY DATA

| No. | S/MA Resin Weight Percent MA | M.W.ᵃ | Viscosity, cps.ᵇ 10% MEK | 25% H₂O | Resin Pickup | Surface Resistivity, ohms/sq. 10% RH | 30% RH | 50% RH |
|---|---|---|---|---|---|---|---|---|
| 2-1 | (Cationic Polymer)ᶜ | | | | 2 | $4.1 \times 10^{11}$ | $1.4 \times 10^{10}$ | $9.7 \times 10^8$ |
| | | | | | 4 | $5.8 \times 10^{10}$ | $2.2 \times 10^9$ | $2.6 \times 10^8$ |
| | | | | | 6 | $1.3 \times 10^{10}$ | $6.1 \times 10^8$ | $9.7 \times 10^7$ |
| 2-2 | 32.6 | ~5,000 | 0.75 | 20 | 2 | $5.8 \times 10^{13}$ | $1.7 \times 10^{12}$ | $7.3 \times 10^{10}$ |
| | | | | | 4 | $2.2 \times 10^{13}$ | $4.9 \times 10^{11}$ | $2.8 \times 10^{10}$ |
| | | | | | 6 | $1.2 \times 10^{13}$ | $3.0 \times 10^{11}$ | $1.4 \times 10^{10}$ |
| 2-3 | 43 | ~15,000 | 1.78 | 58 | 2 | $2.4 \times 10^{13}$ | $3.5 \times 10^{11}$ | $1.7 \times 10^{10}$ |
| | | | | | 4 | $7.3 \times 10^{12}$ | $7.4 \times 10^{10}$ | $6.0 \times 10^9$ |
| | | | | | 6 | $2.8 \times 10^{12}$ | $2.5 \times 10^{10}$ | $2.1 \times 10^9$ |
| 2-4 | 48.5 | ~90,000 | 15.8 | 780 | 2 | $2.8 \times 10^{12}$ | $5.9 \times 10^{10}$ | $2.5 \times 10^9$ |
| | | | | | 4 | $3.1 \times 10^{11}$ | $1.1 \times 10^{10}$ | $6.8 \times 10^8$ |
| | | | | | 6 | $1.2 \times 10^{11}$ | $3.5 \times 10^9$ | $3.0 \times 10^8$ |
| 2-5 | 48.5 | ~150,000 | 51.4 | 3,000 | 2 | $1.6 \times 10^{11}$ | $4.4 \times 10^{10}$ | $2.1 \times 10^9$ |
| | | | | | 4 | $2.5 \times 10^{13}$ | $1.2 \times 10^{10}$ | $6.1 \times 10^8$ |
| | | | | | 6 | $7.8 \times 10^{12}$ | $3.9 \times 10^9$ | $2.8 \times 10^8$ |

ᵃ From 10% MEK viscosity.
ᵇ 10% MEK viscosity prior to hydrolysis; 25% aq. viscosity after KOH hydrolysis—25° C.
ᶜ Cationic Polymer QX 2611.7.

(B) A high molecular weight S/MA copolymer (10% MEK viscosity of about 5,000 cps.; 1,500,000 mw.) was similarly hydrolyzed and applied as an electroconductive coating. The surface resistivity of $8.9 \times 10^9$ ohm/sq. at 7% RH for 8.1% pickup is about the same as the 150,000 mw. Resin 2-4 ($7.5 \times 10^9$ ohm/sq. at 7% RH). Intermediate molecular weight resins which can be applied as aqueous solutions containing 5–30% resin solids and having an operational viscosity less than 10,000 cps. are preferred.

EXAMPLE 3

S/MA salts

A styrene/maleic anhydride copolymer containing 48.5% MA was hydrolyzed with aqueous base, acidified and the free maleic acid copolymer recovered. A series of alkali metal and ammonium salts was prepared by neutralization of the acid copolymer with an appropriate base. Then the effectiveness of the various salts as electroconductive additives was determined as described in Example IB. Typical results are shown in Table 3.

The reason for the surprising superiority of the dipotassium salt typified by Run 3-9 is not known. When tested in a similar manner the sodium and potassium salts of a polystyrene sulfonic acid ($0.5 \times 10^6$ mw.) gave surface resistances of $2.4 \times 10^{10}$ and $2.8 \times 10^{10}$ ohm/sq. at 7% RH with a pickup of 6.9%. Also, a sodium and a potassium polyacrylate ($0.25 \times 10^6$ mw.) gave surfaces resistances of $4.7 \times 10^{10}$ and $1.0 \times 10^{10}$ ohm/sq. under similar conditions.

EXAMPLE 4

Compatability of S/MA salts

Samples of the (K+)₂ S/MA electroconductive resins were mixed with common coating additives. Compatibility was determined by observing the resulting mixtures for uniformity and absence of precipitates or agglomerates. Typical results are given in Table 4.

TABLE 4.—COMPATIBILITY STUDY

| Additive | Cationicᵃ | (K+)₂ S/MA | (K+)₂ S/MA | (K+)₂ S/MA |
|---|---|---|---|---|
| Wt. percent MA | | 43 | 48.5 | 48.5 |
| Visc., 10% MEKᵇ | | 1.78 cps | 15.8 cps | 51.4 cps |
| Aq. solu. pH | 5.1 | 9.1 | 9.6 | 9.2 |
| Percent Solids | 32.4 | 35.7 | 35.0 | 26.5 |
| Visc., 25% H₂O | 55 cps | 58 cps | 780 cps | 3,000 cps |
| Compatibility: | | | | |
| Pigments: | | | | |
| Clay | Poor | Excellent | Excellent | Excellent |
| TiO₂ | do | do | do | Do. |
| CaCO₃ | do | do | do | Do. |
| Binder: | | | | |
| Protein | do | do | do | Do. |
| Casein | do | do | do | Do. |
| Oxid. Starch | Excellent | do | do | Do. |
| S/B Latex | Poor | Good | Good | Good. |
| PVAc | Good | do | do | Do. |
| PVA | Excellent | do | do | Do. |
| Adhesive: Cell. Ether | do | Excellent | Excellent | Excellent. |
| Na alginate | Poor | do | do | Do. |

ᵃ Cationic Polymer QX 2611.7.
ᵇ 10% MEK viscosity prior to hydrolysis; 25% aq. viscosity after KOH hydrolysis—25° C.

TABLE 3.—S/MA SALTS

| Run | S/MA Visc.ᵃ cps. | Salt | Pickup, percent | Surface Resistance, ohm/sq.; 7 percent RH |
|---|---|---|---|---|
| 3-1 | | | None | $>3.0 \times 10^{13}$ |
| 3-2 | 49.3 | (NH₄+)₂ | 7.4 | $2.5 \times 10^{13}$ |
| 3-3 | 49.3 | Na+ | 6.9 | $3.1 \times 10^{11}$ |
| 3-4 | 49.3 | (Na+)(NH₄+) | 6.6 | $7.1 \times 10^{11}$ |
| 3-5 | 49.3 | (Na+)₂ | 6.7 | $5.2 \times 10^{10}$ |
| 3-6 | 51.4 | (Li+)₂ | 6.7 | $2.2 \times 10^{12}$ |
| 3-7 | 51.4 | (Rb+)₂ | 7.3 | $2.9 \times 10^{11}$ |
| 3-8 | 51.4 | (Cs+)₂ | 7.9 | $7.2 \times 10^{11}$ |
| 3-9 | 51.4 | (K+)₂ | 6.8 | $7.5 \times 10^9$ |

ᵃ 10% MEK.

EXAMPLE 5

Other MA copolymers

Other vinylidene/maleic anhydride copolymers in salt form can be used as electroconductive additives for paper. Several other commercially available polymers of maleic anhydride and an equimolar amount of a comonomer have been examined. Two typical examples are given in Table 5.

TABLE 5.—OTHER MA COPOLYMERS

| No. | MA Resin Comonomer | Mole Percent MA | Salt | Pickup, Percent | Surface Resistance Percent RH | (Ohm/sq.) |
|---|---|---|---|---|---|---|
| 5-1 [a] | Methyl vinyl ether | 50 | $(K^+)_2$ | 7.2 | 7 | $1.3 \times 10^{11}$ |
| 5-2 [b] | Ethylene | 50 | $(K^+)_2$ | 7.0 | 7 | $3.4 \times 10^{11}$ |
|  |  |  |  |  | 50 | $2.8 \times 10^{8}$ |

[a] Gantrez AN-139, a medium molecular weight resin having a 10% MEK viscosity of 31.3 cps. at 25° C. from General Aniline and Film.
[b] Monsanto DX-840-61, a high molecular weight resin having a Brookfield viscosity of 4,800 cps. as a 5% aqueous solution of the dipotassium salt.

We claim:

1. In a process for preparing an electrographic printing paper by incorporating an electroconductive additive in the paper stock prior to application of the photoconductive coating, the improvement which comprises treating the paper stock with an aqueous solution of a water-soluble alkali metal salt of a copolymer of an $\alpha,\beta$-unsaturated dicarboxylic anhydride selected from the group consisting of maleic anhydride, chloromaleic anhydride, itaconic anhydride, citraconic anhydride, and aconitic anhydride and a vinylidene monomer copolymerizable therewith and selected from the group consisting of (a) a $C_8$-$C_{12}$ vinylaromatic, (b) a $C_2$-$C_6$ alkene, and (c) a vinyl alkyl ether to incorporate about 1-10 weight percent based on dry weight of the paper of said copolymer salt as the electroconductive additive.

2. The process of claim 1 where the $\alpha,\beta$-unsaturated dicarboxylic anhydride is maleic anhydride.

3. The process of claim 1 where the vinylidene monomer is a vinylaromatic monomer.

4. The process of claim 1 where the electroconductive additive is an alkali metal salt of a styrene/maleic anhydride copolymer having a 10 weight percent solution viscosity in methyl ethyl ketone of at least 0.7 cps. at 25° C.

5. The process of claim 4 where the electroconductive additive is the dipotassium salt of a styrene/maleic anhydride copolymer having a 10 weight percent solution viscosity in methyl ethyl ketone of about 1.3-100 cps. at 25° C.

6. The process of claim 1 where the vinylidene monomer is ethylene.

7. The process of claim 1 where the vinylidene monomer is methyl vinyl ether.

8. The process of claim 1 where the electroconductive additive is a potassium salt of the copolymer.

9. An electrographic printing paper having incorporated as an electroconductive additive about 1-10 weight percent based on dry paper weight of a water-soluble alkali metal salt of a copolymer of an $\alpha,\beta$-unsaturated dicarboxylic anhydride selected from the group consisting of maleic anhydride, chloromaleic anhydride, itaconic anhydride, citraconic anhydride, and aconitic anhydride and a vinylidene monomer copolymerized therewith and selected from the group consisting of (a) a $C_8$-$C_{12}$ vinylaromatic, (b) a $C_2$-$C_6$ alkene, and (c) a vinyl alkyl ether.

10. The electrographic printing paper of claim 9 where the electroconductive additive is an alkali metal salt of a styrene/maleic anhydride copolymer having a 10 weight percent solution viscosity in methyl ethyl ketone of at least 0.7 cps. at 25° C.

11. The electrographic printing paper of claim 10 where the electroconductive additive is the dipotassium salt of a styrene/maleic anhydride copolymer having a 10 weight percent solution viscosity in methyl ethyl ketone of about 1.3-100 cps. at 25° C.

12. The process of claim 4 where the styrene/maleic anhydride copolymer contains about 75-50 mole percent styrene and about 25-50 mole percent maleic anhydride.

13. The electrographic printing paper of claim 10 where the styrene/maleic anhydride copolymer contains about 75-50 mole percent styrene and about 25-50 mole percent maleic anhydride.

References Cited

UNITED STATES PATENTS

| | | | |
|---|---|---|---|
| 2,983,654 | 5/1961 | Dalton | 204—2 |
| 3,283,704 | 11/1966 | Dalton | 204—2 X |
| 3,446,651 | 5/1969 | Clachan et al. | 117—73 |

DANIEL E. WYMAN, Primary Examiner

C. F. DEES, Assistant Examiner

U.S. Cl. X.R.

117—201